United States Patent
Huang et al.

(10) Patent No.: US 11,829,562 B2
(45) Date of Patent: Nov. 28, 2023

(54) REGISTRATION SYSTEM

(71) Applicant: BOE Technology Group Co., Ltd., Beijing (CN)

(72) Inventors: Jijing Huang, Beijing (CN); Zhiming Yang, Beijing (CN); Chuqian Zhong, Beijing (CN); Zongmin Liu, Beijing (CN); Dawei Tang, Beijing (CN); Qiong Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 147 days.

(21) Appl. No.: 17/513,713

(22) Filed: Oct. 28, 2021

(65) Prior Publication Data
US 2022/0137733 A1    May 5, 2022

(30) Foreign Application Priority Data
Oct. 29, 2020   (CN) .......................... 202011183776.3

(51) Int. Cl.
*G06F 3/043*   (2006.01)
*G06K 9/00*   (2022.01)
*G06F 3/0488*   (2022.01)
*G06F 3/04886*   (2022.01)
*G06V 20/00*   (2022.01)

(52) U.S. Cl.
CPC .......... *G06F 3/043* (2013.01); *G06F 3/04886* (2013.01); *G06V 20/00* (2022.01)

(58) Field of Classification Search
CPC ...... G06F 3/043; G06F 3/04886; G06F 3/016; G06F 3/0304; G06F 3/041; G06F 2203/04809; G06F 3/0426; G06F 2203/04108; G06F 3/04883; G06V 20/00; G06V 20/52; G06V 40/28; G16H 40/63; G07C 11/00; G07C 2011/04
See application file for complete search history.

(56) References Cited

U.S. PATENT DOCUMENTS

| | | | | |
|---|---|---|---|---|
| 10,871,555 | B1 * | 12/2020 | Rogers | G01S 15/931 |
| 10,873,812 | B2 * | 12/2020 | Subramanian | H04R 3/12 |
| 2007/0211023 | A1 * | 9/2007 | Boillot | G06F 3/04886 345/156 |
| 2011/0157233 | A1 * | 6/2011 | Kitagawa | G09G 5/227 345/173 |
| 2017/0168630 | A1 * | 6/2017 | Khoshkava | G06F 3/0484 |
| 2019/0042058 | A1 * | 2/2019 | Jing | G06F 3/0436 |
| 2019/0373118 | A1 * | 12/2019 | Tokuchi | H04N 1/32776 |

* cited by examiner

*Primary Examiner* — Md Saiful A Siddiqui
(74) *Attorney, Agent, or Firm* — IPro, PLLC

(57) ABSTRACT

A registration system is provided. The registration system includes: a display device, a collection device and an ultrasonic generating device. The display device is configured to display a graphical user interface. The collection device is configured to collect a scene image at the display device to recognize an operation of a user on the graphical user interface. The ultrasonic generating device is configured to emit ultrasonic signals, so that the ultrasonic signals gather to form one or more virtual buttons for operating the graphical user interface.

12 Claims, 3 Drawing Sheets

REGISTRATION SYSTEM

CROSS-REFERENCE TO RELATED APPLICATION

This application claims priority to Chinese Patent Application No. 202011183776.3 filed in China on Oct. 29, 2020, which is incorporated in its entirety by reference herein

TECHNICAL FIELD

The present disclosure relates to the field of medical technology, and in particular to a registration system.

BACKGROUND

Manual registration is generally inefficient. For a self-service registration system in the related technologies, registration is usually achieved by a user contacting a physical smart device to perform operations, and patients contacting the same smart device may easily lead to spread of infectious diseases.

SUMMARY

Embodiments of the present disclosure provide a registration system. The registration system includes: a display device, a collection device and an ultrasonic generating device. The display device is configured to display a graphical user interface; the collection device is configured to collect a scene image at the display device to recognize an operation of a user on the graphical user interface; the ultrasonic generating device is configured to emit ultrasonic signals, so that the ultrasonic signals gather to form one or more virtual buttons for operating the graphical user interface.

In some embodiments, the collection device includes a depth camera.

In some embodiments, the registration system includes a processor and a driving circuit. The ultrasonic generating device includes an ultrasonic transducer array, and the ultrasonic transducer array includes multiple ultrasonic transducers. The processor is configured to control the driving circuit to drive the ultrasonic transducer array to emit the ultrasonic signals, so that the ultrasonic signals gather to form the one or more virtual buttons.

In some embodiments, the graphical user interface includes multiple graphic buttons, the one or more virtual buttons include one or more virtual button subregions, and each of the multiple graphic buttons corresponds to one of the virtual button subregions.

In some embodiments, the collection device is configured to collect a scene depth image to determine a virtual button subregion to which a position of a hand of the user belongs; the processor is configured to control the driving circuit to drive the ultrasonic transducer array to emit the ultrasonic signals, so that the ultrasonic signals gather in the virtual button subregion to which the position of the hand of the user belongs, to form the virtual button.

In some embodiments, the collection device is configured to collect a scene depth image to recognize a gesture of the user on the virtual button.

In some embodiments, in a case that the gesture is a first action, the processor is configured to generate, according to operation information corresponding to the gesture, a control instruction to control the registration system to perform a corresponding operation.

In some embodiments, controlling the registration system to perform the corresponding operation includes: clicking the graphic button corresponding to the virtual button subregion to which the position of the hand of the user belongs.

In some embodiments, the collection device is configured to collect a scene depth image to determine a virtual button subregion to which a position of a hand of the user belongs and a distance between the hand and the display device; in a case that the distance between the hand of the user and the display device is less than or equal to a first threshold, the processor is configured to control the driving circuit to drive the ultrasonic transducer array to emit the ultrasonic signals, so that the ultrasonic signals gather in the virtual button subregion to which the position of the hand of the user belongs, to form the virtual button.

In some embodiments, in a case that the distance between the hand of the user and the display device is less than or equal to a second threshold, the processor is configured to generate, according to operation information corresponding to the position of the hand of the user, a control instruction to control the registration system to perform a corresponding operation, where the second threshold is less than the first threshold.

In some embodiments, controlling the registration system to perform the corresponding operation includes: clicking the graphic button corresponding to the virtual button subregion to which the position of the hand of the user belongs.

In some embodiments, the processor is configured to: monitor in real time, according to a recognition result of a scene depth image, a virtual button subregion to which a position of a hand of the user belongs; and control, in a case that a distance between the hand of the user and the display device is less than or equal to a first threshold, the driving circuit to drive the ultrasonic transducer array to emit the ultrasonic signals, so that the ultrasonic signals gather in the virtual button subregion to which the position of the hand of the user belongs, to form the virtual button.

In some embodiments, the processor is configured to: generate a focus modulation signal, where the focus modulation signal is for making the ultrasonic transducer array operate and form at a first position the ultrasonic signals capable of being sensed by a human body; store channel delay data, where the channel delay data is required for focusing the ultrasonic signals generated by the ultrasonic transducer array at the first position; and perform delay processing on the focus modulation signal according to the channel delay data, and provide the processed focus modulation signal for the driving circuit.

In some embodiments, the display device is configured to display the position of the hand of the user.

In some embodiments, the ultrasonic generating device includes an indicator light configured to generate an indicator signal for indicating a successful click on the virtual button.

For additional aspects and advantages of embodiments of the present disclosure, some of them are provided in the descriptions in the following, and some of them become apparent from the descriptions in the following, or may be understood through practice of the present disclosure.

BRIEF DESCRIPTION OF THE DRAWINGS

The above and/or additional aspects and advantages of the disclosure will become apparent and more readily appreciated from the following descriptions of the embodiments in conjunction with the accompanying drawings.

DETAILED DESCRIPTION

Hereinafter, embodiments of the present disclosure are described in detail. Examples of the embodiments are shown in the accompanying drawings, where the same or similar reference signs represent the same or similar elements or elements having the same or similar functions. The embodiments described hereinafter with reference to the drawings are exemplary, which are intended to explain the present disclosure and should not be construed as limitation to the present disclosure.

Figure 1:
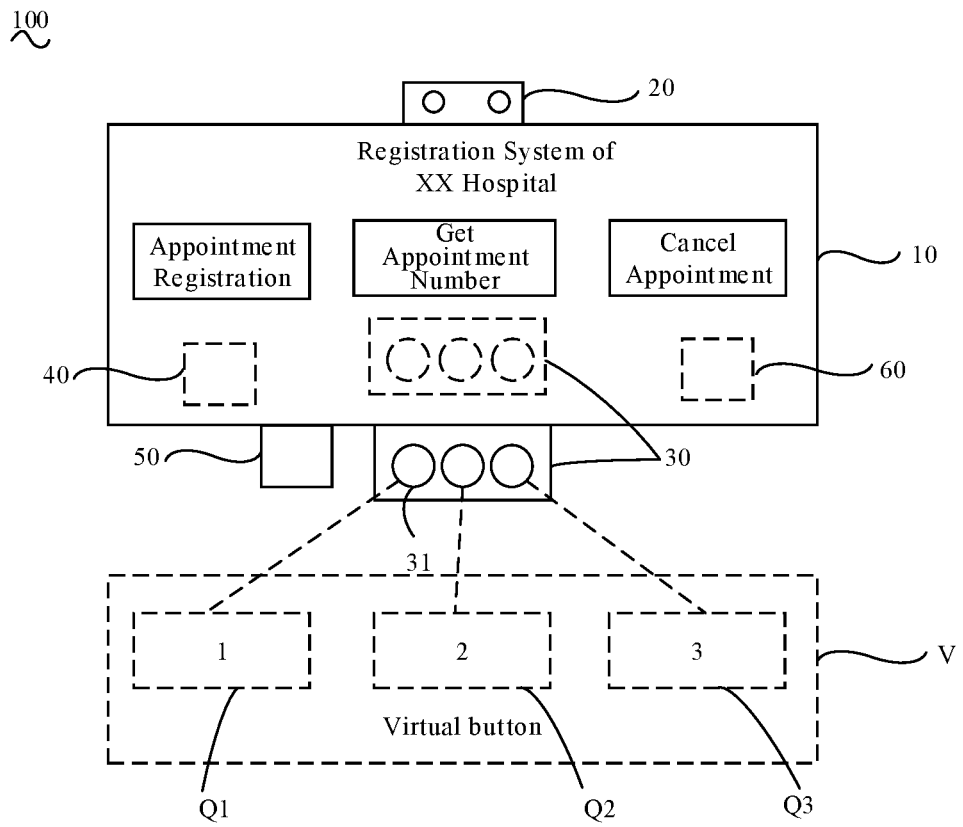
FIG. 1 is a structural diagram of a registration system according to some embodiments of the present disclosure.

Referring FIG. 1, the present disclosure provides a registration system 100. The registration system 100 includes a display device 10, a collection device 20, and an ultrasonic generating device 30. The registration system 100 may further include a processor 40 and a driving circuit 50.

The display device 10 is configured to display a graphical user interface of the registration system 100. The display device 10 may also be configured to display a position of a hand of a user. The collection device 20 is configured to collect a scene image at the display device 10 to recognize an operation of the user on the graphical user interface. The ultrasonic generating device 30 is configured to emit ultrasonic signals, so that the ultrasonic signals gather to form one or more virtual buttons for operating the graphical user interface.

The ultrasonic generating device 30 includes an ultrasonic transducer array, and the ultrasonic transducer array includes multiple ultrasonic transducers. The processor 40 is configured to control the driving circuit 50 to drive the ultrasonic transducer array to emit the ultrasonic signals, so that the ultrasonic signals gather to form the one or more virtual buttons.

Specifically, the positions of the virtual buttons may be set in a space in front of or below the display device 10, which is convenient for the user to operate while looking at the display screen.

The registration system of the present disclosure is a non-contact hospital registration system based on ultrasonic. The ultrasonic generating device is used to form the virtual buttons. Registration is performed in a non-contact manner. The patient does not touch the physical machine when the patient autonomously registers with the self-service registration system, and may not be susceptible to infectious diseases, which can effectively avoid the spread of infectious diseases.

Referring FIG. 1, the display device 10 is mainly configured to display the graphical user interface of the registration system 100 and the position of the hand of the user. The graphical user interface includes multiple graphic buttons ("Appointment Registration", "Get Appointment Number" and "Cancel Appointment" as shown in FIG. 1), and the multiple virtual buttons include multiple virtual button subregions (Q1, Q2 and Q3 as shown in FIG. 1). Each graphic button corresponds to a virtual button subregion, for example, the graphic button "Appointment Registration" corresponds to the virtual button subregion "Q1", the graphic button "Get Appointment Number" corresponds to the virtual button subregion "Q2", and the graphic button "Cancel Appointment" corresponds to the virtual button subregion "Q3", which is easy to operate and friendly to the user.

The virtual button subregion may be a triangular, rectangular or polygonal region, and its specific shape is not limited to this. A virtual button is arranged in an area of a virtual button subregion, and the user may touch the virtual button in the virtual button subregion.

There may be one or more virtual button subregions. When there is one virtual button subregion, correspondingly one virtual button is arranged. In this case, the ultrasonic generating device 30 is configured to form one virtual button. This situation may be applied to a relatively simple registration system, such as a registration system only for registration, or only for getting a number or only for cancelling registration, which is convenient for the user to operate with the single button.

When multiple virtual buttons need to be set for the user, the ultrasonic generating device 30 is configured to form multiple virtual buttons in this case, and correspondingly multiple virtual button subregions need to be set. For example, as shown in FIG. 1, when 3 virtual buttons are set for the user, the 3 virtual buttons respectively represent appointment registration, getting appointment number, and appointment cancellation. Then, 3 virtual button subregions need to be set to correspond to the 3 virtual buttons, for realizing multi-function operation on the registration system. When the number of the virtual buttons is set to be 4, 4 virtual button subregions are set to correspond to the 4 virtual buttons, and so on, the other number of virtual button subregions and virtual buttons may be set according to requirements of the user.

The display device 10 may be a display screen, and the user may obtain the position of the current operation part of the user in the display screen and operate the registration system, through the graphical user interface in the display screen. The operation part of the user part is described by taking the hand of the user as an example. When the hand of the user is at the position of the virtual button 1 formed by the ultrasonic generating device 30, the hand of the user may be displayed on the graphic button "Appointment Registration" on the graphical user interface in real time in the form of a cursor correspondingly. That is, the display device 10 is used to display the hospital registration system, and cooperate with the ultrasonic generating device 30 and the collection device 20 to realize the non-contact registration process on the autonomous registration system for the user.

The collection device 20 is a depth camera, and specifically may be a binocular depth camera. The collection device 20 may be arranged above or below the outside of the display device 10, or may be arranged inside the display device 10. In FIG. 1, the collection device 20 is arranged above the display device 10. The number of the collection device 20 may be one or may be multiple. When one collection device 20 is arranged, the registration system 100 is simple to install and easy to disassemble; when multiple collection devices 20 are arranged, the multiple collection devices 20 may be arranged at various positions outside or inside the display device 10, respectively, which ensures that the captured user operation position is more accurate, and in a case that a collection device 20 is damaged, the remaining collection devices 20 may be used as backup cameras to ensure the normal use of the registration system 100.

In some embodiments, the collection device 20 is configured to collect a scene depth image to determine a virtual button subregion to which a position of a hand of the user belongs; the processor 40 is configured to control the driving circuit to 50 drive the ultrasonic transducer array to emit the ultrasonic signals, so that the ultrasonic signals gather in the virtual button subregion to which the position of the hand of the user belongs, to form the virtual button.

Specifically, for example, when the virtual button subregion to which the position of the hand of the user belongs in the scene depth image collected by the collection device 20 is the virtual button subregion "Q1" in FIG. 1, the processor 40 may control the ultrasonic transducer array to emit the ultrasonic signals to form a virtual button 1 in the virtual button subregion "Q1", and then control the display device 10 of the registration system 100 to perform corresponding interface switching and functional operations corresponding to the virtual button 1 to realize the "Appointment Registration" function corresponding to the virtual button 1.

In some other embodiments, the collection device 20 is configured to collect a scene depth image to recognize a gesture of the user on the virtual button. When the gesture is a first action, the processor 40 is configured to generate a control instruction according to operation information corresponding to the gesture to control the registration system 100 to perform a corresponding operation. The first action may be a predetermined action.

It can be understood that the gesture of the user may be a gesture of extending a finger to touch or a gesture of clicking a virtual button, which is similar to a user extending a finger to touch an electronic screen or click an electronic screen. The difference is that the virtual button is touched in this disclosure, which belongs to non-contact touch; the electronic screen is physical, and the finger of the user may touch the electronic entity, which produces a sense of touch. The predetermined action may be a gesture of clicking a virtual button.

Specifically, the predetermined action may refer to an action of the finger of user clicking the virtual button. For example, when the scene depth image collected by the collection device 20 shows an action of the user's finger clicking the virtual button, the collection device 20 may recognize the action of the user's finger clicking the virtual button in the gesture, and the processor 40 may generate, according to the action of the user's finger clicking the virtual button, a control instruction. The control instruction is to control the cursor in the display device 10 to trigger the graphic button corresponding to the virtual button, thereby controlling the registration system 100 to perform the corresponding operation. For example, the corresponding operation may be one of "Appointment Registration", "Get Appointment Number" and "Cancel Appointment" shown in FIG. 1.

In some embodiments, the collection device 20 is configured to collect a scene depth image to determine a virtual button subregion to which a position of a hand of the user belongs and a distance between the hand and the display device 10; in a case that the distance between the hand of the user and the display device 10 is less than or equal to a first threshold, the processor 40 is configured to control the driving circuit 50 to drive the ultrasonic transducer array to emit the ultrasonic signals, so that the ultrasonic signals gather in the virtual button subregion to which the position of the hand of the user belongs, to form the virtual button.

Specifically, the virtual button subregion may be the region Q1 surrounded by the dotted line in the virtual button 1 as shown in FIG. 1, or it may refer to the region Q2 surrounded by the dotted line in the virtual button 2, or it may refer to the region Q3 surrounded by the dotted line in the virtual button 3.

The user's finger is taken as an example. Reference is made to FIG. 1. When the scene depth image collected by the collection device 20 shows that the user's finger enters the virtual button region V corresponding to the ultrasonic transducer array, the collection device 20 may collect scene depth images in real time to determine the virtual button subregion where the user's finger is located and the distance between the hand and the display device 10. For example, it is assumed that the distance is A. In this case, when the distance A is less than or equal to a first threshold, the first threshold being such as 0.5 meters or 0.2 meters or 0.1 meters or other value which is not limited herein, the processor 40 may control the ultrasonic transducers 31 to emit ultrasonic signals to form the virtual button, and inform the user that there is an virtual button for the next operation.

When the user's finger is further close to the virtual button, in this case, after the collection device 20 collects scene depth images again, it is determined that the virtual button subregion where the user's finger is located is Q1 (or Q2, Q3) and the distance between the hand and the display device 10 is B. If the distance B is less than or equal to a second threshold, the second threshold being less than the first threshold (for example, when the first threshold is 0.5 meters, the second threshold may be 0.4 meters, 0.2 meters, or 0.1 meters), the registration system 100 determines that the user has successfully clicked the virtual button at this time. The processor 40 may generate a control instruction according to the corresponding operation information at the position of the hand of the user to control the registration system 100 to perform the corresponding operation. For example, the virtual button 2 is at the position of the hand of the user, and the virtual button 2 corresponds to the graphic button of "Get Appointment Number" on the display device 10, then, the control instruction of the processor 40 is to control the registration system to perform the operation of "Get Appointment Number".

The ultrasonic generating device 30 includes an ultrasonic transducer array, and the ultrasonic transducer array includes multiple transducers 31, and the multiple ultrasonic transducers 31 are used to emit ultrasonic signals, so that the ultrasonic signals gather to form the virtual buttons. The multiple ultrasonic transducers 31 may be used to form one or more virtual buttons. When the user needs only one virtual button in the registration system 100, for example, only the virtual button of "Get Appointment Number" is needed, the multiple of ultrasonic transducers 31 of the ultrasonic generating device 30 are used to emit ultrasonic signals to the same predetermined position to form a virtual button. When the user needs multiple virtual buttons in the registration system 100, for example, when three virtual buttons of "Appointment Registration", "Get Appointment Number" and "Cancel Appointment" are required, every 6, every 8 or more ultrasonic transducers 31 may be controlled to form a virtual button. For example, every 6 ultrasonic transducers 31 are controlled to form a virtual button, and a total of 3*6=18 ultrasonic transducers 31 need to be set to form an ultrasonic transducer array.

The ultrasonic generating device 30 may be arranged outside the display device 10; or, it may be arranged inside the display device 10; or, it may be arranged both outside the display device 10 and inside the display device 10 (as shown in FIG. 1). When the ultrasonic generating device 30 is arranged outside the display device 10, in a case that the ultrasonic generating device 30 is damaged, there is no need to spend time searching for the location of the ultrasonic generating device 30, it can be repaired directly, the operation is simple, and the ultrasonic generating device 30 can be quickly repaired. When the ultrasonic generating device 30 is arranged inside the display device 10, it is beneficial to the miniaturization of the registration system 100.

It can be understood that a transducer is a device that converts electrical energy, mechanical energy, or sound energy from one form of energy into another form of energy, which is also called an active sensor. The transducer is the core component of the ultrasonic equipment, and its characteristic parameters determine the performance of the entire equipment.

Figure 2:
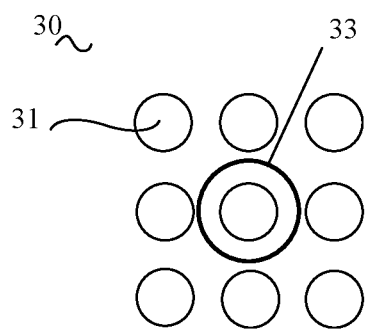
FIG. 2 is a schematic structural diagram of an ultrasonic transducer array in a registration system according to some embodiments of the present disclosure.
Figure 3:
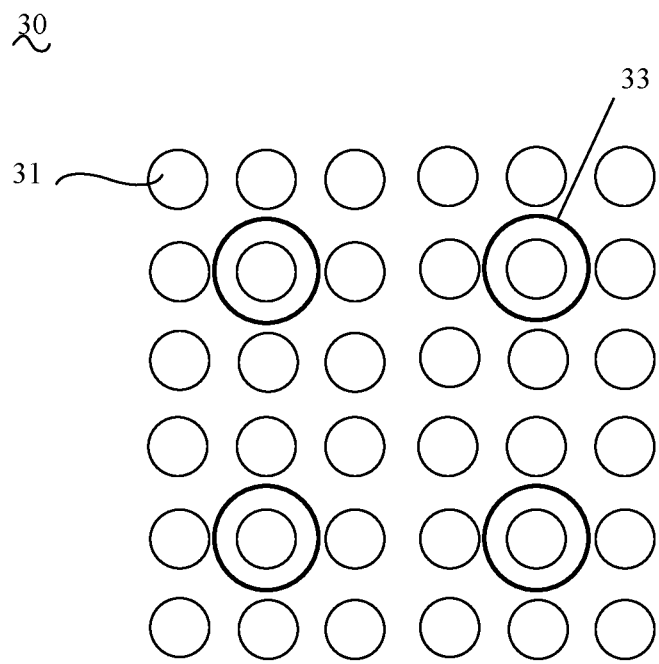
FIG. 3 is a schematic structural diagram of an ultrasonic transducer array in a registration system according to some embodiments of the present disclosure.

Referring to FIG. 2 or FIG. 3, the ultrasonic transducer array includes multiple ultrasonic transducers 31, which may be an array shown in FIG. 2 or an array shown in FIG. 3. The ultrasonic transducer 31 is a transducer with only transmission function or a transducer with integrated transmission and reception functions. The multiple ultrasonic transducers 31 are used to focus the ultrasonic signal emitted by each ultrasonic transducer 31 to a position (which may be a predetermined position) that can be operated by the user in the air, thereby generating the effect of a virtual button. The predetermined position may be a position that is level with the user's chest and faces the user, which is convenient for the user to operate the virtual buttons, or may be a plane position perpendicular to the part that is level with the user's chest, which is not limited herein. In addition, the virtual buttons may be prompt operation buttons set according to user needs. The prompt operation buttons may be set as prompt operation buttons such as register, cancel, yes, and return to previous step, or may include keyboard-type buttons to input related information such as registration content. The keyboard-type buttons may be, for example, phonetic keyboard-type buttons.

It is understandable that the energy of the ultrasonic signal emitted by one ultrasonic transducer 31 is weak and not enough to produce the effect of a virtual button. Therefore, the present disclosure uses the energy of the ultrasonic signals emitted by multiple ultrasonic transducers 31 to generate the virtual buttons, so as to provide a touch effect similar to that of touching a physical button for the user. The multiple ultrasonic transducers 31 refer to two or more ultrasonic transducers 31. The coverage area of the multiple ultrasonic signals generated by the multiple ultrasonic transducers 31 is larger than that of ultrasonic signal generated by one ultrasonic transducer 31, which is convenient for the user to touch the virtual button.

Specifically, the multiple ultrasonic transducers 31 may generate a virtual button for every 6 ultrasonic transducers, and generate a total of 3 virtual buttons, which are 3 virtual buttons corresponding to "appointment registration", "get appointment number" and "cancel appointment" respectively. There are a total of 18 ultrasonic transducers. It should be noted that the number of ultrasonic transducers 31 may be set according to user needs, which is not limited herein.

The ultrasonic generating device 30 further includes an indicator light 33, and the indicator light 33 may be arranged around the ultrasonic transducers 31 or in a region surrounded by the multiple ultrasonic transducers 31. When the registration system 100 determines that the user presses the button, the registration system 100 controls the indicator light around the ultrasonic transducer 31 to correspondingly emit light to prompt that the user clicks the button successfully, the registration system 100 transmits the information of the user pressing the button to the processor 40, and the processor 40 may control the display device 10 to display corresponding operation information according to the information of the user pressing the button. For example, if the information of the button pressed by the user is registration, the content displayed by the display device 10 may be operation information of input content of patient's name and patient's age. The indicator light 33 may be a light emitting diode (LED).

The registration system 100 of the present disclosure is a non-contact hospital registration system based on ultrasonic. Registration is performed in a non-contact manner. The patient does not touch the physical machine when the patient autonomously registers with the self-service registration system, and may not be susceptible to infectious diseases, which can effectively avoid the spread of infectious diseases.

In some embodiments, the processor 40 is configured to control the indicator light 33 to generate an indicator signal when the distance between the hand of the user and the display device 10 is less than or equal to the second threshold.

Specifically, it can be known from the above that when the distance between the hand of the user and the display device 10 is less than or equal to the first threshold, the processor 40 controls the multiple ultrasonic transducers 31 to simultaneously emit ultrasonic signals and focus the ultrasonic signals to a predetermined position to form a virtual button. Then, when it is detected, according to the scene image or the depth image collected by the collection device 20, that the distance between the hand of the user and the display device 10 is less than or equal to the second threshold (the second threshold is less than the first threshold, the first threshold may be 0.5 m, 0.4 m, 0.3 m, 0.2 m, or 0.1 m, and the second threshold may be 2 cm, 1 cm, 0.5 cm, 0.2 cm, or 0.1 cm), it means that the user has touched the virtual button, and the processor 40 may control the indicator light to light up to prompt that the user clicks successfully. In this case, the processor 40 may control the collection device 20 to capture the operation action of the user, for example, the action of clicking the virtual button with a finger.

In the registration system 100 of the present disclosure, when detecting the distance relationship between the user's position and the display device 10 through the collection device 20, the ultrasonic transducers 31 may be controlled to emit ultrasonic signals to form the virtual button in real time, and the indicator light may be controlled in real time to prompt that the user clicks the button successfully, and the information of clicking the button successfully may be sent to the registration system 100 to realize a non-contact virtual operation, which effectively avoids the problem of rapid spread of infectious diseases through the physical button when a person gets sick in a case that multiple users touch the same physical button.

In some embodiments, the processor 40 is configured to:
monitor in real time, according to a recognition result of a scene depth image, a virtual button subregion to which a position of a hand of the user belongs; and control, in a case that a distance between the hand of the user and the display device is less than or equal to a first threshold, the driving circuit to drive the ultrasonic transducer array to emit the ultrasonic signals, so that the ultrasonic signals gather in the virtual button subregion to which the position of the hand of the user belongs, to form the virtual button.

In some embodiments, the processor 40 is configured to:

generate a focus modulation signal, where the focus modulation signal is for making the ultrasonic transducer array operate and form at a first position the ultrasonic signals capable of being sensed by a human body;

store channel delay data, where the channel delay data is required for focusing the ultrasonic signals generated by the ultrasonic transducer array at the first position; and perform delay processing on the focus modulation signal according to the channel delay data, and provide the processed focus modulation signal for the driving circuit.

Figure 4:
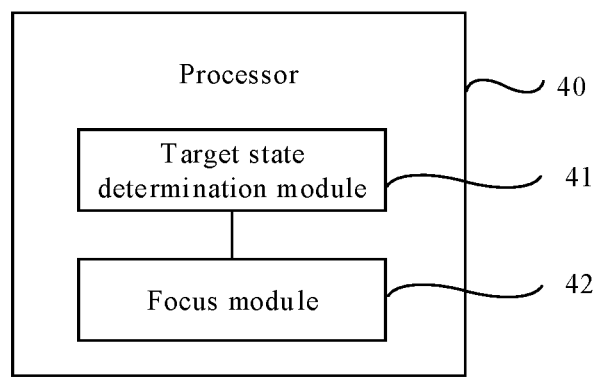
FIG. 4 is a schematic structural diagram of a processor in a registration system according to some embodiments of the present disclosure.

Referring to FIG. 4, the processor 40 includes a target state determination module 41 and a focus module 42. The processor 40 may use an FPGA chip to control the entire registration system 100. FPGA (Field Programmable Gate Array) chip is a product of further development on the basis of PAL, GAL, CPLD and other programmable devices. FPGA chip appears as a kind of semi-custom circuit in the field of application specific integrated circuit (ASIC), which not only solves the shortcomings of customized circuits, but also overcomes the shortcomings of the limited number of gate circuits of the original programmable devices.

The target state determination module 41 is configured to monitor the virtual button subregion to which the position of the hand of the user belongs in real time according to the recognition result of the scene depth image, and determine whether the hand of the user is close to the display device 10 according to the distance between the hand and the display device 10.

Specifically, the scene depth image is a depth image collected by the collection device 20, and the recognition result of the collection device 20 recognizing the depth image includes: a linear distance between the hand of the user and each virtual button subregion in the depth image, and a distance between the hand of the user and the display device in the depth image.

The target state determination module 41 monitors the virtual button subregion to which the position of the hand of the user belongs in real time by determining the linear distance of the hand of the user relative to each virtual button subregion. For example, referring to FIG. 1, when the distance of the hand of the user relative to the virtual button subregion Q1 is 0, it means that the hand of the user is in the virtual button subregion Q1; when the distance of the hand of the user relative to the virtual button subregion Q2 is 0, it means that the hand of the user is in the virtual button subregion Q2; when the distance of the hand of the user relative to the virtual button subregion Q3 is 0, it means that the hand of the user is in the virtual button subregion Q3.

The target state determination module 41 determines whether the hand of the user is approaching the display device 10 based on the distance between the hand of the user and the display device 10 in the depth image. For example, when the distance between the hand of the user and the display device 10 in the depth image is less than or equal to the first threshold, the target determination module determines that the hand of the user is approaching the display device 10. When the distance between the hand of the user and the display device 10 in the depth image is less than or equal to the second threshold, and it is recognized, in multiple scene depth images collected by the collection device 20 at multiple consecutive moments, that the distance between the hand of the user and the device 10 is less than or equal to the second threshold, then, it is determined, in conjunction with the result of the target determination module monitoring whether the position of the hand is in the virtual button subregion, that the hand of the user has approached the designated position relative to the display device 10, so that it is determined that at this time the hand of the user has clicked the virtual button.

The focus module 42 is used to obtain the determination result of the target state determination module 41. The determination result may be that the hand of the user has clicked the virtual button and the hand of the user is located in the virtual button subregion, and when the distance between the hand of the user and the display device 10 is less than or equal to the first threshold (that is, when the user clicks the virtual button subregion), the driving circuit 50 is controlled to drive the ultrasonic transducer array to emit ultrasonic signals, so that the ultrasonic signals gather in the virtual button subregion to which the position of the hand of the user belongs, to form the virtual button. The explanation of the first threshold is the same as that described above, which is not described in detail herein.

Figure 5:
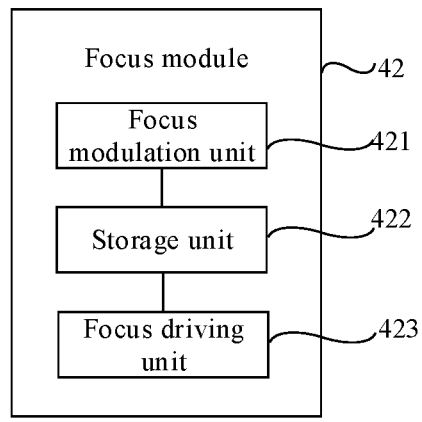
FIG. 5 is a schematic structural diagram of a focus module in a registration system according to some embodiments of the present disclosure.

Referring to FIG. 5, the focus module 42 may include a focus modulation unit 421, a storage unit 422 and a focus driving unit 423. The focus module 42 is mainly formed by an FPGA with an ARM core, and the internal of the FPGA is divided into a PS end and a PL end. The ARM core is a core of the central processing unit.

The focus modulation unit 421 is used to generate a focus modulation signal, where the focus modulation signal is for making the ultrasonic transducers 31 operate and form at a first position the ultrasonic signals capable of being sensed by a human body. The first position may be a predetermined position. The focus driving unit 423 is configured to perform corresponding delay processing on the focus modulation signal according to the channel delay data, and provide the processed focus modulation signal to the corresponding multiple channels in the driving circuit 50 respectively. The focus modulation unit 421 is the PS end of the FPGA, and the focus driving unit 423 is the PL end of the FPGA. The storage unit 422 stores the channel delay data, where the channel delay data is required for focusing the ultrasonic signals generated by the ultrasonic transducers 31 at the predetermined position.

It is understandable that the distances from the multiple ultrasonic transducers 31 to the predetermined position correspond to multiple different channels, and the lengths of the multiple channels are different. Correspondingly, the distances of the ultrasonic signals transmitted by the multiple ultrasonic transducers 31 to the predetermined location are not the same. Therefore, the multiple ultrasonic transducers 31 may produce ultrasonic signal delays, and the multiple ultrasonic signal delays are not conducive to quickly forming the virtual button at the same time. Therefore, it is needed to arrange the focus modulation unit 421 and the focus driving unit 422 to perform focus modulate on the ultrasonic signals, so that the multiple ultrasonic signals can quickly form the virtual button at the same time.

The storage unit 422 calculates the channel delay data of the multiple channels corresponding to the multiple ultrasonic transducers 31 according to the system setting, and the storage unit transmits the channel delay data to the focus driving unit 423. Then, the focus driving unit 423 may perform corresponding delay processing on the focus modulation signal according to the channel delay data and provide the processed focus modulation signal to the driving circuit 50.

Figure 6:
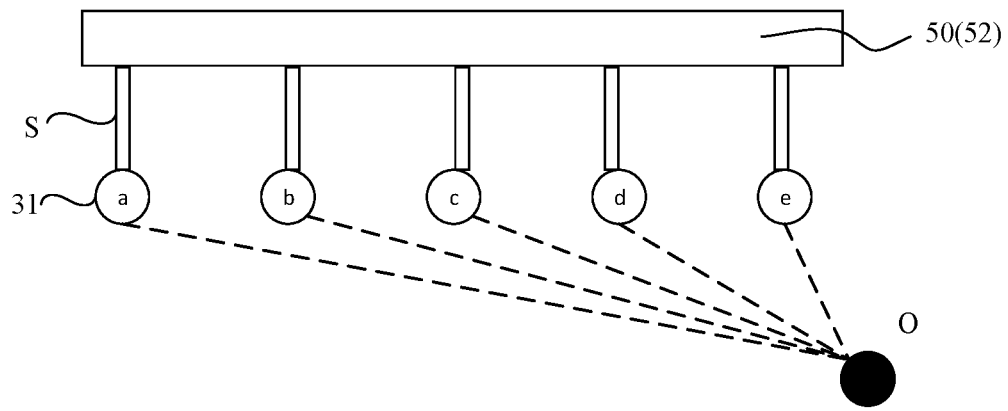
FIG. 6 is a schematic diagram of a scene of delaying data in a registration system according to some embodiments of the present disclosure.

Specifically, the channel delay data may refer to delay time. The closer the ultrasonic transducer 31 to the predetermined position, the longer the delay time. Referring to FIG. 6, the longer the distance from the predetermined position O, the shorter the delay time of the ultrasonic transducer 31. The five ultrasonic transducers 31 are a, b, c, d, and e respectively, and then delay times of the multiple channels S of the driving circuit 50 corresponding to a, b, c, d, and e are 0.02S, 0.04S, 0.06S, 0.08S and 0.1S, from far to near.

The registration system 100 of the present disclosure performs delay processing on the focus modulation signal according to the channel delay data and sends it to the multiple channels of the second driving module 52, so that the second driving module 52 may drive the multiple ultrasonic transducers 31 to emit ultrasonic signals according to the delay time, so that multiple ultrasonic transducers 31 can quickly emit ultrasonic signals at the same time.

In addition, the focus modulation unit 421 may be used to read the data of the collection device 20 to obtain the operation position of the user captured by the collection device 20 and the position change of the operation part of the user touching the button recognized by the collection device 20. When the collection device 20 captures the click action of the finger, a click operation similar to that of a contact registration system is generated, and corresponding interface switching and corresponding operations are performed to realize the registration function.

Figure 7:
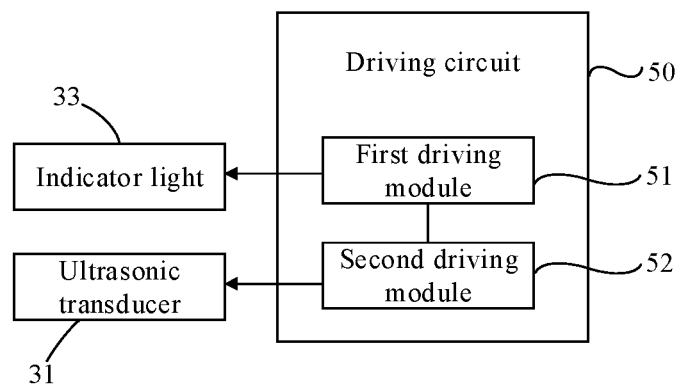
FIG. 7 is a schematic structural diagram of a driving circuit in a control circuit according to some embodiments of the present disclosure.

Referring to FIG. 7, the driving circuit 50 may include a first driving module 51 and a second driving module 52. The first driving module 51 and the second driving module 52 may be a first driving sub-circuit and a second driving sub-circuit, respectively.

The first driving module 51 is used to control any light source around the ultrasonic transducers 31 to emit indicator light (as shown in FIG. 2 or FIG. 3). Specifically, when the target state determination module 41 monitors that the virtual button subregion to which the position of the hand of the user belongs is virtual button 1, and the collected distance between the hand of the user and the display device 10 is less than or equal to the second threshold, the hand of the user touches the virtual button, and the first driving module 51 may drive the indicator light 33 to light up to prompt successful click of the user.

The second driving module 52 is used to drive the ultrasonic transducer array (multiple ultrasonic transducers 31) to emit ultrasonic signals. It is understandable that the second driving module 52 is used to drive the multiple ultrasonic transducers 31 of the ultrasonic transducer array to emit ultrasounds according to a preset emission mode, so that the ultrasounds gather in the air to generate a touch sensation of a button, forming a virtual button.

Referring to FIG. 1 again, the registration system 100 further includes a power supply module 60. The power supply module 60 provides power for the display device 10, the collection device 20, the ultrasonic generating device 30, the processor 40, and the driving circuit 50. The power supply module 60 may be arranged outside the display device 10, for easy installation and removal. The power supply module 60 may be arranged inside the display device 10 and integrated with the display device 10 (as shown in FIG. 1), which is beneficial to the miniaturization of the overall registration system 100. The power supply module 60 is electrically connected to the display device 10, the collection device 20, the ultrasonic generating device 30, the processor 40 and the driving circuit 50. The power supply module 60 may be a generator or a solar energy-saving power supply, which is not limited herein.

The registration system of the present disclosure can not only be applied to a self-service registration platform of a hospital, but also can be applied in some scenarios of small keyboard input that require appointment registration, such as bank counter registration, hotel counter registration and hotel reservation registration, etc., effectively avoiding the spread of infectious diseases caused by contact in public occasions.

Unless otherwise defined, the technical or scientific terms used in the present disclosure shall have the common meanings understood by those of ordinary skill in the art to which the present disclosure belongs. The terms "first", "second", and the like used in the present disclosure do not indicate any order, quantity, or importance, but are only used to distinguish different components. Word such as "including" or "having" means that the element or item listed before the word covers the element or item listed after the word and the equivalent thereof without excluding other elements or items. Word such as "connected" or "coupled" are not limited to physical or mechanical connection, but may include electrical connection, whether direct or indirect. "Up", "down", "left", "right", etc., are only used to indicate the relative position relationship. When the absolute position of the described object changes, the relative position relationship may change accordingly.

The above descriptions illustrate some implementations of the present disclosure. It should be noted that, for those of ordinary skill in the art, without departing from the principles of the present disclosure, various improvements and modifications can be made. These improvements and modifications shall fall with the protection scope of the present disclosure.

What is claimed is:

1. A registration system, comprising:
   a display device, configured to display a graphical user interface;
   a collection device, configured to collect a scene image at the display device to recognize an operation of a user on the graphical user interface; and
   an ultrasonic generating device, configured to emit ultrasonic signals, so that the ultrasonic signals gather to form one or more virtual buttons for operating the graphical user interface;
   wherein the registration system comprises a processor and a driving circuit;
   wherein the ultrasonic generating device comprises an ultrasonic transducer array, and the ultrasonic transducer array comprises a plurality of ultrasonic transducers;
   wherein the processor is configured to control the driving circuit to drive the ultrasonic transducer array to emit the ultrasonic signals, so that the ultrasonic signals gather to form the one or more virtual buttons;
   wherein the processor is configured to:
   monitor in real time, according to a recognition result of a scene depth image, a virtual button subregion to which a position of a hand of the user belongs; and
   control, in a case that a distance between the hand of the user and the display device is less than or equal to a first threshold, the driving circuit to drive the ultrasonic transducer array to emit the ultrasonic signals, so that the ultrasonic signals gather in the virtual button subregion to which the position of the hand of the user belongs, to form the virtual button;

wherein the processor is configured to:

generate a focus modulation signal, wherein the focus modulation signal is for making the ultrasonic transducer array operate to emit the ultrasonic signals at a first position to form the virtual button;

store channel delay data, wherein the channel delay data is required for focusing the ultrasonic signals generated by the ultrasonic transducer array at the first position; and perform delay processing on the focus modulation signal according to the channel delay data, and provide the processed focus modulation signal for the driving circuit.

2. The registration system according to claim 1, wherein the collection device comprises a depth camera.

3. The registration system according to claim 1, wherein the graphical user interface comprises a plurality of graphic buttons, the one or more virtual buttons comprise one or more virtual button subregions, and each of the plurality of graphic buttons corresponds to one of the virtual button subregions.

4. The registration system according to claim 3, wherein the collection device is configured to collect a scene depth image to determine a virtual button subregion to which a position of a hand of the user belongs;

wherein the processor is configured to control the driving circuit to drive the ultrasonic transducer array to emit the ultrasonic signals, so that the ultrasonic signals gather in the virtual button subregion to which the position of the hand of the user belongs, to form the virtual button.

5. The registration system according to claim 4, wherein the collection device is configured to collect a scene depth image to recognize a gesture of the user on the virtual button.

6. The registration system according to claim 5, wherein in a case that the gesture is a first action, the processor is configured to generate, according to operation information corresponding to the gesture, a control instruction to control the registration system to perform a corresponding operation.

7. The registration system according to claim 6, wherein controlling the registration system to perform the corresponding operation comprises: clicking the graphic button corresponding to the virtual button subregion to which the position of the hand of the user belongs.

8. The registration system according to claim 3, wherein the collection device is configured to collect a scene depth image to determine a virtual button subregion to which a position of a hand of the user belongs and a distance between the hand and the display device;

wherein in a case that the distance between the hand of the user and the display device is less than or equal to a first threshold, the processor is configured to control the driving circuit to drive the ultrasonic transducer array to emit the ultrasonic signals, so that the ultrasonic signals gather in the virtual button subregion to which the position of the hand of the user belongs, to form the virtual button.

9. The registration system according to claim 8, wherein in a case that the distance between the hand of the user and the display device is less than or equal to a second threshold, the processor is configured to generate, according to operation information corresponding to the position of the hand of the user, a control instruction to control the registration system to perform a corresponding operation, wherein the second threshold is less than the first threshold.

10. The registration system according to claim 9, wherein controlling the registration system to perform the corresponding operation comprises: clicking the graphic button corresponding to the virtual button subregion to which the position of the hand of the user belongs.

11. The registration system according to claim 1, wherein the display device is configured to display the position of the hand of the user.

12. The registration system according to claim 1, wherein the ultrasonic generating device comprises an indicator light configured to generate an indicator signal for indicating a successful click on the virtual button.

* * * * *